(12) United States Patent
Waldburger

(10) Patent No.: US 9,968,070 B2
(45) Date of Patent: May 15, 2018

(54) PRESS COVER FOR A CHEESE MOLD

(71) Applicant: Kalt Maschinenbau AG, Lütisburg (CH)

(72) Inventor: Peter Waldburger, Niederbüren (CH)

(73) Assignee: Kalt Maschinenbau AG, Lutisburg (CH)

( * ) Notice: Subject to any disclaimer, the term of this patent is extended or adjusted under 35 U.S.C. 154(b) by 292 days.

(21) Appl. No.: 14/475,954

(22) Filed: Sep. 3, 2014

(65) Prior Publication Data

US 2015/0059593 A1    Mar. 5, 2015

(30) Foreign Application Priority Data

Sep. 4, 2013    (CH) ..................................... 1509/13

(51) Int. Cl.
*A01J 25/15*    (2006.01)
*A01J 25/13*    (2006.01)
*A01J 25/12*    (2006.01)

(52) U.S. Cl.
CPC ............. *A01J 25/15* (2013.01); *A01J 25/126* (2013.01); *A01J 25/13* (2013.01)

(58) Field of Classification Search
CPC ........... A01J 25/126; A01J 25/13; A01J 25/15
USPC ......................................... 99/460, 458, 456
See application file for complete search history.

(56) References Cited

U.S. PATENT DOCUMENTS

| | | | | |
|---|---|---|---|---|
| 913,889 | A | * | 3/1909 | Hershiser .................. C08B 1/12 100/116 |
| 2,815,708 | A | * | 12/1957 | Pauly ...................... A01J 25/13 100/124 |
| 2,942,983 | A | * | 6/1960 | Sadler ................. A23C 19/0323 426/36 |
| 3,514,857 | A | * | 6/1970 | Rossen .................... A01J 25/13 249/113 |
| 3,650,030 | A | * | 3/1972 | Delamere ............... A01J 25/13 249/112 |
| 3,797,980 | A | * | 3/1974 | Budahn ................... A01J 25/13 249/172 |

(Continued)

FOREIGN PATENT DOCUMENTS

| | | |
|---|---|---|
| BR | 9300409 | 9/1993 |
| CH | 707000 | 3/2014 |

(Continued)

OTHER PUBLICATIONS

English translation of European Search Report dated Feb. 9, 2015 for European Patent Application No. 14181770.0-1655.

(Continued)

*Primary Examiner* — Reginald L Alexander
(74) *Attorney, Agent, or Firm* — Fleit Gibbons Gutman Bongini & Bianco PL; Paul D. Bianco; Katharine Davis Wong

(57) ABSTRACT

A press cover for a cheese mold, in particular for a cheese mold of metal, having a round or polygonal cross section. The shape and dimensions of the press cover correspond to the inner cross section of the cheese mold. The press cover is to be designed in a simple manner, to withstand a press power, and also to satisfy high hygiene demands. This is achieved in that the press cover includes a perforated plate, the shape and dimensions of which corresponds to the inner cross section of the cheese mold, on which a reinforcing rib structure is arranged.

14 Claims, 4 Drawing Sheets

(56) References Cited

U.S. PATENT DOCUMENTS

| | | | |
|---|---|---|---|
| 3,838,955 A | 10/1974 | Dubbeld | |
| 3,841,210 A * | 10/1974 | Brog | A01J 25/13 100/110 |
| 4,418,616 A * | 12/1983 | Streeter | A01J 25/15 99/458 |
| 4,440,073 A * | 4/1984 | Quilliou | A01J 25/15 100/110 |
| 4,472,339 A * | 9/1984 | van der Ploeg | A01J 25/13 249/113 |
| 4,509,413 A * | 4/1985 | Granberg | A01J 25/115 100/110 |
| 4,817,515 A * | 4/1989 | Bjerre | A01J 25/15 100/194 |
| 5,206,496 A | 4/1993 | Clement et al. | |
| 6,912,949 B2 * | 7/2005 | Brizio | A47J 31/303 99/295 |
| 8,322,535 B2 * | 12/2012 | Shoham | A47J 19/005 209/235 |
| 2014/0087014 A1 | 3/2014 | Walburger | |

FOREIGN PATENT DOCUMENTS

| | | |
|---|---|---|
| DE | 1030612 | 12/1956 |
| DE | 2823182 | 12/1978 |
| EP | 0350777 | 1/1990 |
| EP | 0406899 | 1/1991 |
| EP | 0543185 | 5/1993 |
| EP | 0543899 | 6/1993 |
| EP | 1269832 | 1/2003 |
| EP | 2710889 | 3/2014 |
| FR | 2527421 | 12/1983 |
| FR | 2981827 | 5/2013 |
| WO | 92/03297 | 3/1992 |
| WO | 2004/087513 | 10/2004 |

OTHER PUBLICATIONS

European Search Report dated Feb. 9, 2-15 for European Patent Application No. 14181770.0-1655.

Google search results for "Conidur fine hole triangular", retrieved Oct. 24, 2016 showing article entitled Belts With Interlaced Bars, Welded Wedge Wire Screens from Hein..www.hellotrade.com, 1 page, shown publication dated Apr. 29, 2013.

Webpage from Hein Lehmann website, Conidur fine hole sheets, 1 page, retrieved Oct. 24, 2016, publication date prior to Jan. 1, 2013.

* cited by examiner

PRESS COVER FOR A CHEESE MOLD

FIELD OF THE INVENTION

The invention relates to a press cover for a cheese mold, in particular for a cheese mold of metal comprising a round or polygonal cross section, which, in turn is arranged in a cassette press or the like.

BACKGROUND OF THE INVENTION

A device for industrially producing loaves of cheese is known from EP-A-350777, for example. It comprises a filling press comprising a trough, which is rectangular and which is open on the top, for accommodating molds, a column frame for arranging a press head, which can be lifted and lowered, and a distributing head for supplying and metering the raw cheese mass into the molds, and a gantry wagon, which can be displaced on the trough, for guiding the distributing head and for handling a turning mechanism for the molds. Distributing head as well as turning mechanism must thereby be provided or changed manually, respectively. The wall of the mold consists of a perforated plate and a plurality of molds can be arranged in sets. Provision is made at the end surfaces of a set for cylindrical journals for docking a handling device.

EP-A-406899 shows a further development of such a device, in the case of which the molds are accommodated in cassettes, which, in turn, are arranged in a compact and row-like manner in the trough. Provision is made above the molds for a press head comprising press dies, which are oriented to the molds, for pressing the raw cheese mass.

The actual press mold is thereby surrounded by a pot-shaped jacket comprising an air supply duct (EP-B-1269832). An air duct is formed through this and the raw cheese mass, which adheres to the screen holes of the perforated plate of the mold, can be removed from the press hoop side after the pressing.

According to EP-B-543185, a mold or press cover, respectively, can be connected (in a self-centering manner) to the press die via a tilting device, so that a suction of the mold cover due to possible tilting movements is avoided at the cheese mass. The mold itself is round or square and can consist of an outer container and an inner, perforated jacket.

A further cheese mold comprising a perforated mold wall of metal is disclosed in DE-B-1030612. On its inner surface, this mold wall encompasses evenly distributed, low ridges and depressions of up to approx. 1 mm, which are not to damage the cheese rind in response to the removal of the loaf of cheese, even if the cheese is knocked out of the mold. According to DE-C-2823182, such a cheese mold comprising a perforated wall can also consist of plastic, on the inner side of which provision is made for grooves, which are parallel to one another, comprising a triangular cross section. The grooves are separated by means of ribs comprising breaks in the transition and one-part bottom area. The cleaning of such mold walls or double bottoms is extensive.

SUMMARY OF THE INVENTION

In an embodiment, the invention is based on the object of developing a press cover for a cheese mold, in particular a cheese mold of metal, which is suitable for being arranged at the press head of a cassette press or the like, which is designed in a simple manner, which withstands a press power and which also satisfies high hygienic demands.

The press cover according to the invention consists substantially of a perforated plate, the shape and dimensions of which corresponds to the inner cross section of a cheese mold, reinforcing rib structures located thereon, which provide the press cover with the necessary stiffness. The rib structure is connected to the perforated plate in an inseparable manner at thin webs. Perforated plate and rib structure preferably consist of stainless steel.

On the one hand, the press cover according to the invention provides for a good whey discharge and, on the other hand, can be cleaned easily and completely from both sides.

In contrast, known press covers consist of a stiff cover plate, for example, of steel, the shape and dimensions of which corresponds to the inner cross section of a cheese mold, and of a thin perforated plate, which is arranged at the bottom side of the cover plate. The cover plate furthermore encompasses a number of larger openings for discharging whey in response to the pressing of raw cheese mass.

Whey and cheese residues or other contaminations, which are not visible and which are difficult to remove, can settle in the unperforated areas of the cover plate.

Preferred embodiments are also disclosed.

The perforated plate is preferably a finely perforated plate, in particular of Conidur®, the rib structure is formed from a stainless steel.

In the case of round cheese molds, individual ribs extend in the shape of struts across the center point, preferably running in a ray-shaped or radial manner, respectively, starting at the longitudinal axis of the mold across the perforated plate to the circumference. They thereby intersect transverse rings, which are arranged in a ring-shaped manner, and are connected thereto, wherein provision can be made for a plurality of ribs, comprising different diameters, so as to be spaced apart from one another. In the case of polygonal cheese molds, struts are also possible instead of the rings parallel to the outer edges.

The rib structure furthermore encompasses loops, which are directed upwards, or the like, which make it possible to arrange the press cover at a press head, for example.

The wall of the cheese mold itself is one piece and is provided with a rib structure, preferably in the transition and bottom area at the outer wall.

The rib structure can be used for round as well as for angled molds with corresponding adaptations.

In the case of round molds, individual ribs preferably extend in a ray-shaped or radial manner, respectively, starting at the longitudinal axis of the mold across the bottom into the area of the jacket wall or also all the way to the upper edge of the jacket wall. Preferably, the ribs in the bottom area are intersected by transverse ribs, which are arranged in a ring-shaped manner, wherein a plurality of rings comprising different diameters can be provided so as to be spaced apart from one another.

In the case of rectangular molds, ribs are arranged at least parallel to one another, wherein provision can be made for further transverse ribs, which are also arranged parallel to one another, at right angles thereto.

The solidity and stability of the cheese mold are increased, the bottom can be controlled visually, in particular with reference to hygiene and cleaning. The double wall of the bottom, which is currently typical, can thus be forgone, which also makes it possible to forgo blowing in air for removing the loaf of cheese.

The ribs are dimensioned such that the outer dimensions of existing cassettes for accommodating cheese molds can remain unchanged.

BRIEF DESCRIPTION OF THE DRAWINGS

The invention will be described in more detail below in an exemplary embodiment.

DETAILED DESCRIPTION OF EMBODIMENTS

Figure 2:
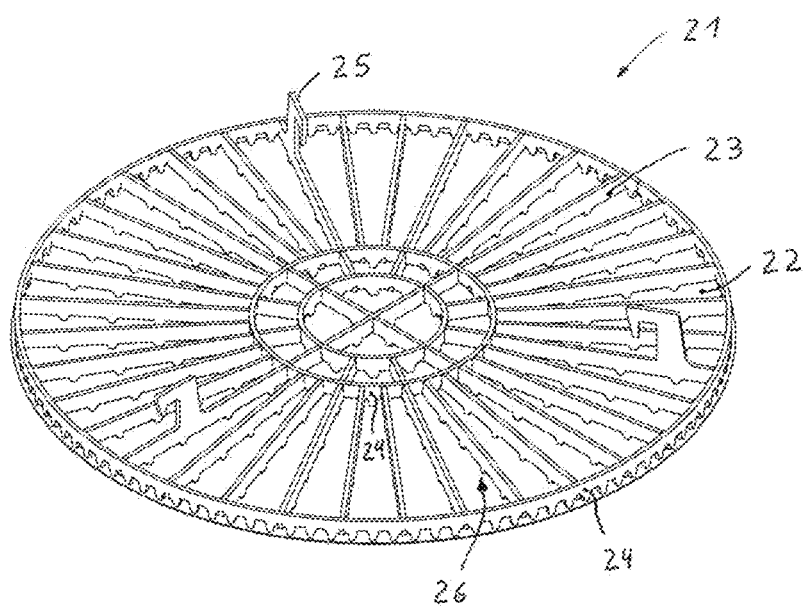
FIG. 2 shows a press cover according to the invention for a cheese mold.

A press cover 21 (FIG. 2) according to the invention for a round cheese mold 1 consists of a perforated plate 22, preferably a finely perforated plate, for example of Conidur®, the shape and dimensions of which corresponds to the inner cross section of the cheese mold 1, and a reinforcing rib structure 23, 24 located thereon of a stainless steel, which provides the press cover 21 with the necessary stiffness for squeezing out whey. The rib structure 23, 24 is connected in an inseparable manner to the perforated plate 22, in particular by means of welding, at thin webs 26. In the case of the round cheese mold 1, individual ribs in the form of struts 23 extend across the center point, preferably running in a ray-shaped or radial manner, respectively, starting at the longitudinal axis of the mold across the perforated plate 22 all the way to the circumference. They thereby intersect rings or transverse ribs 24, respectively, which are arranged in a ring-shaped manner, and are connected to them at the intersecting points, wherein provision can be made for a plurality of rings comprising different diameters so as to be spaced apart from one another.

Figure 3:
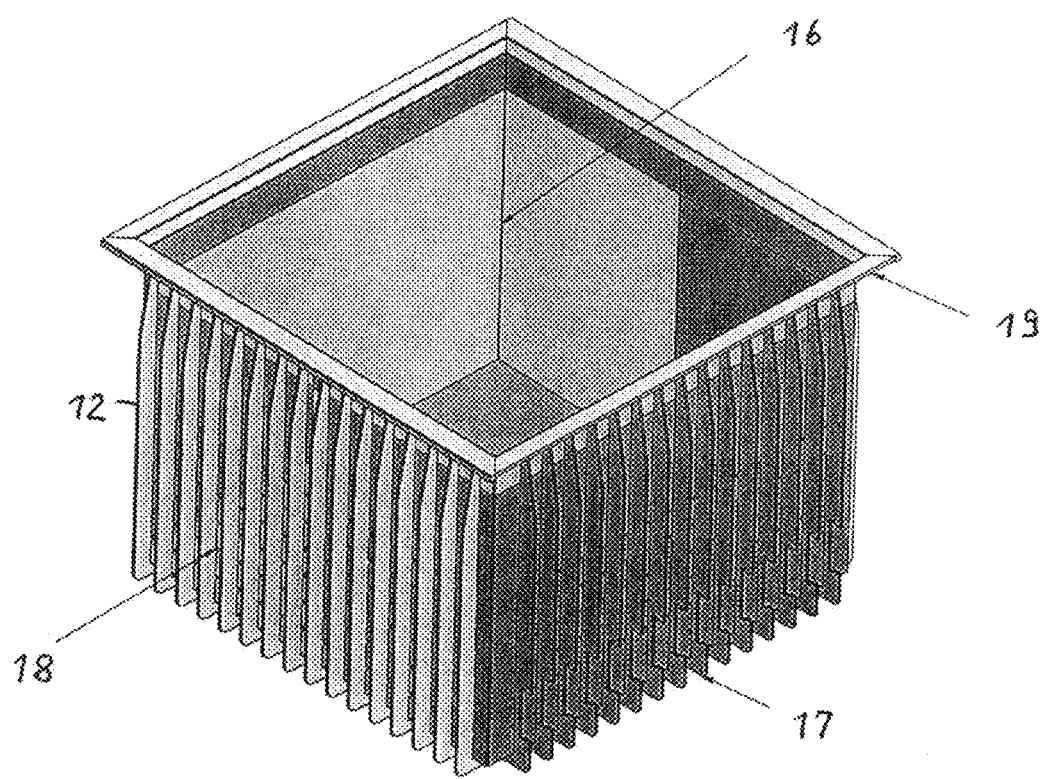
FIG. 3 shows a rectangular cheese mold.
Figure 4:
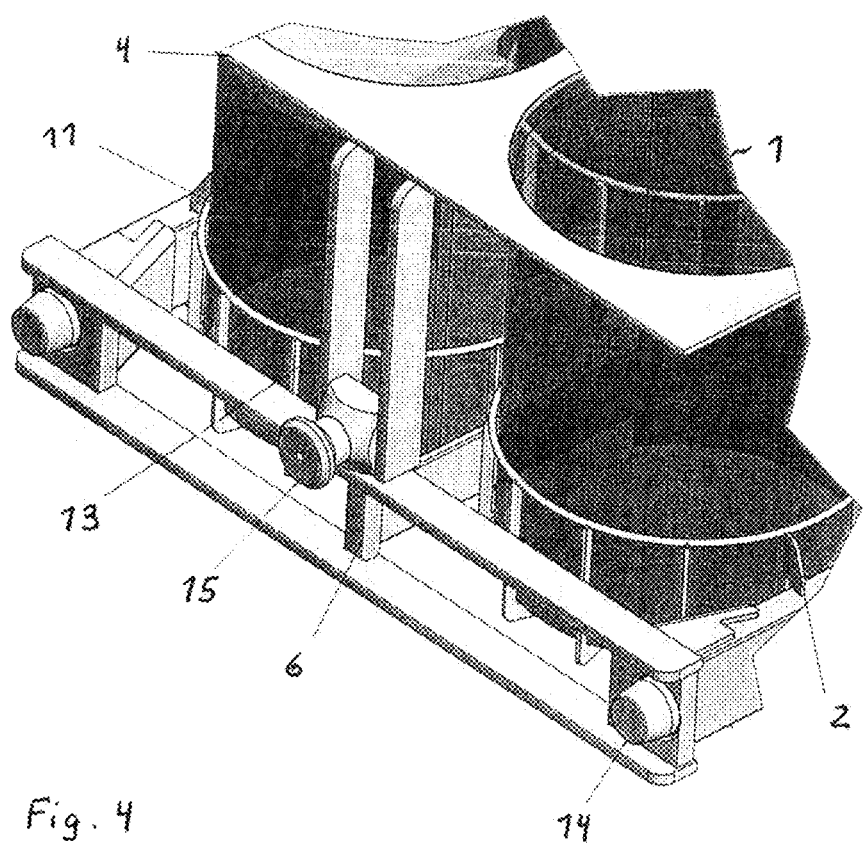
FIG. 4 shows a round cheese mold in a cassette (section).

Cheese molds 1, 12 (FIGS. 1 and 3) according to the invention of metal, in particular a stainless steel, are used in known, non-illustrated cassette presses. Such a cassette press serves for the liquid-reducing pressing of raw cheese mass in a manner, which is known per se, and comprises

- a trough, which is rectangular in top view and which is open on the top, comprising cassettes, which are rectangular in top view and which are open on the top, which are arranged next to one another in rows at right angles to the longitudinal direction of the trough,
- round or angled molds 1, 12 for accommodating the raw cheese mass, which is to be pressed, and are arranged in the cassettes 6, and which encompass at least one bottom 5 and a jacket 4 comprising at least one outlet for the liquid, which is to be squeezed out, wherein a cassette 6 comprises at least one mold 1, 12 and at least the bottom 5 of the mold 1, 12 is provided with a rib structure 2, and wherein a mold 1, 12 can be part of the cassette 6,
- a press head, which is supported on end columns, comprising a plurality of press dies, which are oriented to the molds 1, for pressing the raw cheese mass, e.g. embodied according to the disclosure of EP-B-543899, as well as a hold-down device, if applicable, for pressing the press head away from the cassettes,
- a pipe manifold system or a filling apparatus, respectively, for filling the raw cheese mass into the molds 1, 12,
- at least one handling device, which can be displaced along the longitudinal sides of the trough, for lifting, displacing and placing a cassette 6 on a conveying device outside of the trough,
- a device for rotating/turning the cassette 6 or cassette row, respectively, about the longitudinal axis thereof.

Preferably, a shaking unit in the form of a tensioning frame, which is arranged horizontally above the conveying device and which is supported in a resilient manner, and which is provided with unbalance motors, can furthermore preferably be assigned to the cassette press for accommodating a cassette 6. The loaves of cheese are emptied onto the conveying device only after a shaking.

Figure 1:
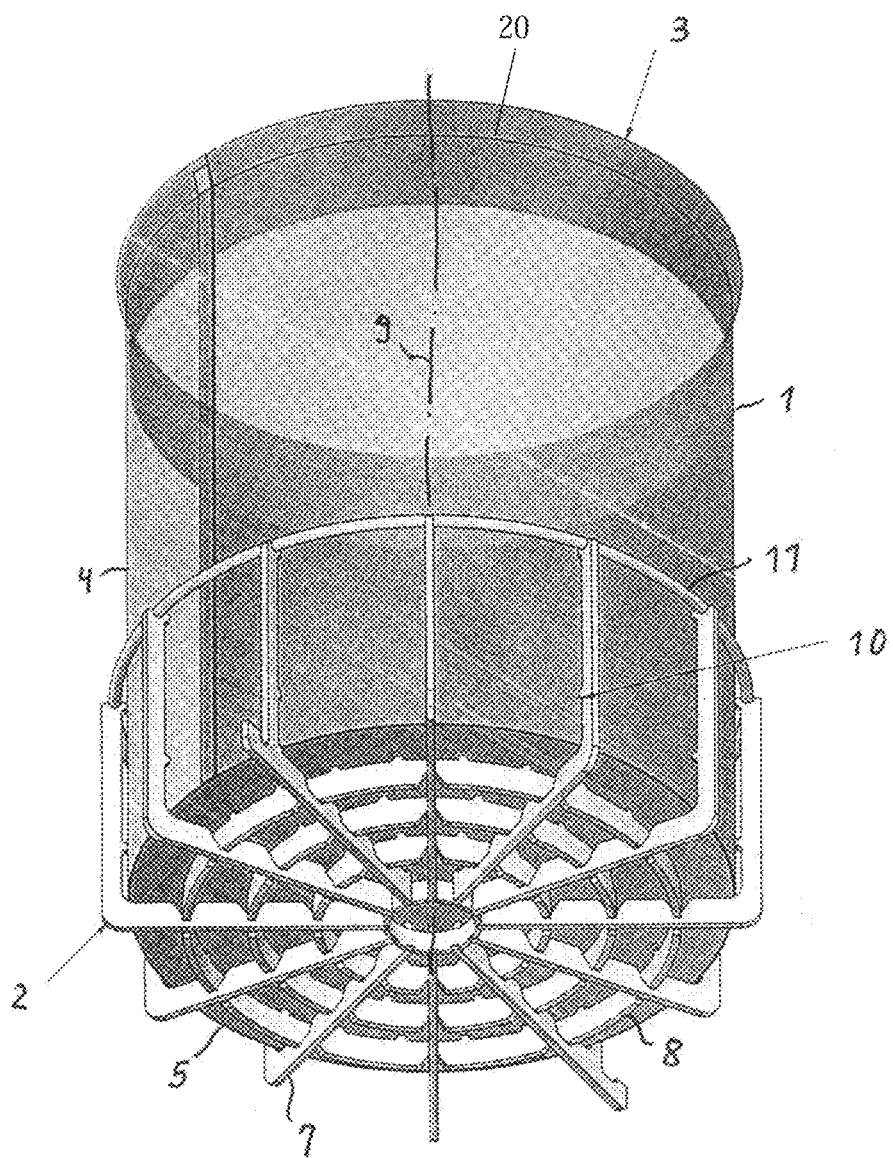
FIG. 1 shows a round cheese mold.

A round mold 1 according to FIG. 1 comprises a cylindrical jacket 4 comprising an upper basket 3 and a bottom 5, which is provided with a rib structure 2 all the way into the transition area of the outer jacket wall.

Longitudinal ribs 7 extend radially, starting at the longitudinal axis 9 across the bottom 5 and continuing as jacket ribs 10 all the way into the area of the jacket wall. The ends of the jacket ribs 10 are welded to a jacket ring 11. The longitudinal ribs 7 are connected to rings 8 by means of material engagement and/or in a positive manner in the bottom area, wherein provision is made for a plurality of rings 8 comprising different diameters, so as to be spaced apart from one another. An inner ring 8 defines the expansion of the longitudinal ribs 7 towards the longitudinal axis 9.

In contrast, rectangular molds 12 encompass longitudinal and jacket ribs 17, 18, which are preferably arranged parallel to one another, wherein provision is made at right angles thereto for further longitudinal and jacket ribs 17, 18, which are also arranged parallel to one another.

The jacket ribs 18 can reach all the way to a basket 19, which forms the upper edge of the jacket 16. However, the mold 12 can also be embodied without basket 19.

In the case of round as well as angled molds 1, 12, the ribs can be connected to the jacket and bottom by means of point welding. For this purpose, the ribs then encompass protruding noses and point welding is performed at every nose. In spite of the one-piece bottom and jacket, the molds encompass a high stability, in particular for accommodating the press forces. The individual molds 1, 12 are arranged in the bottom area of cassettes in a manner, which is known per se.

The ribs are dimensioned such that the outer dimensions of existing cassettes 6 for accommodating molds can remain unchanged.

The individual molds 1 are arranged in the bottom area of cassettes 6 (FIG. 2) in a manner, which is known per se. A cassette 6 consists at least of one frame, which consists of struts 13, at which provision is made for drive centering pins 15 for accommodating and turning the cassette 6 as well as for centering pins 14 for the trough or the tensioning frame, respectively. At least the jacket 4, 16 of the cheese mold consists of a perforated plate. The perforation must satisfy the condition that the whey discharge must be smaller than the influx of raw cheese mass. This is the only way to ensure that the cheese curds are always located below the whey level. This is the only way to avoid air pockets (blind inclusions) in the cheese.

For cheese, which is to be pressed to be high, that is, hard cheese, the jacket wall and the bottom, if applicable, consist of finely perforated plate Conidur®. Due to the specific perforation, the formation of "hairs" can be avoided, as it appears in the case of plastic molds or normal, thicker perforated plates.

In contrast, a conventional perforation can be sufficient in response to the squeezing of soft cheese or semi-hard cheese. Below the basket 3, the perforated plate can encompass a whey edge 20 comprising a coarser perforation than the remaining jacket 4, 16, in particular in response to the production of hard cheese. In the case of softer cheese, a different perforation of the jacket 4, 16 is not mandatory.

On principle, the cheese molds can also consist of a plastic.

LIST OF REFERENCE NUMERALS 1 round mold
2 rib structure
3 basket
4 jacket
5 bottom
6 cassette
7 longitudinal rib
8 ring
9 longitudinal axis
10 jacket rib
11 jacket ring
12 rectangular mold
13 strut
14 centering pin
15 drive centering pin
16 jacket
17 longitudinal rib
18 jacket rib
19 basket
20 whey edge
21 pressing cover
22 perforated plate
23 strut
24 transverse rib, ring
25 loop
26 web

The invention claimed is:

1. A press cover for a cheese mold, the press cover comprising:
a perforated plate having a round shape and moveable within the cheese mold, the perforated plate having a cross-sectional shape and dimension which correspond to an inner cross section of the cheese mold; and
a reinforcing rib structure having ribs extending radially from a center of the perforated plate and a plurality of spaced-apart rings supporting the ribs, the reinforcing rib structure inseparably affixed to the perforated plate at webs which extend away from the perforated plate, thereby not forming an enclosed space between the reinforcing rib structure and the perforated plate coplanar to the perforated plate;
wherein the reinforcing rib structure forms substantially the only support for the perforated plate when the perforated plate is pressed into a cheese curd; and
wherein the reinforcing rib structure and affixed perforated plate have sufficient strength to withstand pressing without an additional supporting plate.

2. The press cover according to claim 1, wherein each of the ribs has a shape of a radially-extending strut.

3. The press cover according to claim 1, wherein the perforated plate is formed from a stainless steel, and the rib structure is formed from a stainless steel.

4. The press cover according to claim 1, wherein the reinforcing rib structure further comprises a plurality of protruding noses point welded to the perforated plate to non-removably affix the perforated plate to the reinforcing rib structure.

5. The press cover according to claim 1, wherein the webs are point welded to the perforated plate.

6. The press cover according to claim 1, the reinforcing rib structure further comprising loops extending upward from the perforated plate and connectable to a press head of a cassette press and positioned to transfer all pressing forces of the press head through the reinforcing rib structure to the perforated plate.

7. The press cover according to claim 1, wherein the perforated plate and reinforcing rib structure are welded to each other.

8. The press cover according to claim 1, wherein the reinforcing rib structure forms a plurality of loops extending upwards from the perforated plate and positioned to engage a press head of a cassette press thereby transferring all pressure from the press head to the reinforcing rib structure and perforated plate.

9. The press cover according to claim 2, wherein at least one of the plurality of spaced-apart rings intersects and connects the struts.

10. A press cover for a cheese mold, the press cover comprising:
a metallic plate having a round cross section corresponding to an inner cross section of the cheese mold, the metallic plate perforated with holes; and
a reinforcing rib structure affixed to the metallic plate and having spaced-apart struts extending radially away from a central axis;
wherein the reinforcing rib structure inseparably extends from the metallic plate to thereby not form an enclosed region coplanar with the metallic plate;
wherein the reinforcing rib structure forms substantially the only support for the metallic plate as the metallic plate is pressed into a cheese curd; and
wherein the reinforcing rib structure and affixed metallic plate have sufficient strength to withstand pressing without an additional supporting plate lying coplanar to the metallic plate.

11. The press cover according to claim 10, wherein the struts are intersected by and connected to a plurality of spaced apart rings.

12. A press cover for a cheese mold, the press cover comprising:
a metallic plate having shape and dimensions of an inner cross section of the cheese mold, the metallic plate having fine perforations forming the only apertures for passage of whey through the metallic plate; and
a reinforcing rib structure including a plurality or spaced-apart ribs extending radially from a center of the metallic plate and a plurality of rings intersecting and supporting the spaced-apart ribs; the plurality of spaced-apart ribs inseparably attached to and extending away from the metallic plate to thereby not form an enclosed region coplanar with the metallic plate;
wherein the spaced-apart ribs form substantially the only support for the metallic plate as the metallic plate is pressed into a cheese curd; and
wherein the reinforcing rib structure and attached metallic plate have sufficient strength to withstand pressing without an additional supporting plate coplanar with the metallic plate.

13. The press cover according to claim 12, wherein the metallic plate is stainless steel.

14. The press cover according to claim 12, wherein the metallic plate includes no holes other than the fine perforations forming the apertures through which the whey must pass to pass completely through the cheese mold.

* * * * *